United States Patent
Meschter et al.

(10) Patent No.: US 6,517,989 B2
(45) Date of Patent: Feb. 11, 2003

(54) RETROFITTED SELF-DEVELOPING FILM ASSEMBLAGES AND METHODS OF MAKING THE SAME

(75) Inventors: John E. Meschter, Cambridge, MA (US); Harry R. Parsons, Burlington, MA (US)

(73) Assignee: Polaroid Corporation, Waltham, MA (US)

(*) Notice: Subject to any disclaimer, the term of this patent is extended or adjusted under 35 U.S.C. 154(b) by 0 days.

(21) Appl. No.: 10/087,670

(22) Filed: Mar. 1, 2002

(65) Prior Publication Data

US 2002/0177063 A1 Nov. 28, 2002

Related U.S. Application Data

(63) Continuation of application No. 09/920,357, filed on Aug. 1, 2001, now abandoned.
(60) Provisional application No. 60/222,156, filed on Aug. 1, 2000.

(51) Int. Cl.[7] .................. G03C 8/46; G03C 8/48; G03C 8/44
(52) U.S. Cl. .................. 430/208; 430/207; 430/209; 430/499
(58) Field of Search .................. 430/207, 208, 430/209, 499

(56) References Cited

U.S. PATENT DOCUMENTS

| | | | |
|---|---|---|---|
| 2,609,296 A | 9/1952 | Land | 95/8 |
| 2,634,886 A | 4/1953 | Land | 222/107 |
| 2,708,864 A | 5/1955 | Land | 95/89 |
| 3,415,645 A | 12/1968 | Land | 96/3 |
| 3,652,282 A | 3/1972 | Land | 96/76 |
| 3,695,884 A | 10/1972 | Land | 96/76 C |
| 3,794,490 A | 2/1974 | Nerwin | 96/76 C |
| 3,804,626 A | 4/1974 | Harvey | 96/76 C |
| 3,833,382 A | 9/1974 | Land | 96/76 C |
| 3,907,563 A | 9/1975 | Land | 96/3 |
| 3,990,895 A | 11/1976 | Land | 96/25 |
| 4,038,077 A | 7/1977 | Land | 96/29 R |
| 4,693,963 A | 9/1987 | McCole | 430/499 |
| 5,453,804 A | 9/1995 | Norris | 354/83 |
| 5,888,683 A | 3/1999 | Gula et al. | 430/22 |
| 5,888,693 A * | 3/1999 | Meschter et al. | 430/207 |
| 5,981,137 A | 11/1999 | Meschter et al. | 430/208 |
| 6,019,525 A | 2/2000 | Norris | 396/583 |
| 6,291,128 B1 * | 9/2001 | Meschter et al. | 430/207 |

* cited by examiner

Primary Examiner—Richard L. Schilling

(57) ABSTRACT

The present invention is an improved film assemblage of the self developing type that allows separation of both the pod and trap portions of the film frame, but sealing of the ends of the separated film portions including pod, trap, and image area. The present invention also provides such a film assemblage of the foregoing type whereby further ensuring uniform flow of the processing fluid during the spreading process. A method of manufacturing said film is also provided.

6 Claims, 4 Drawing Sheets

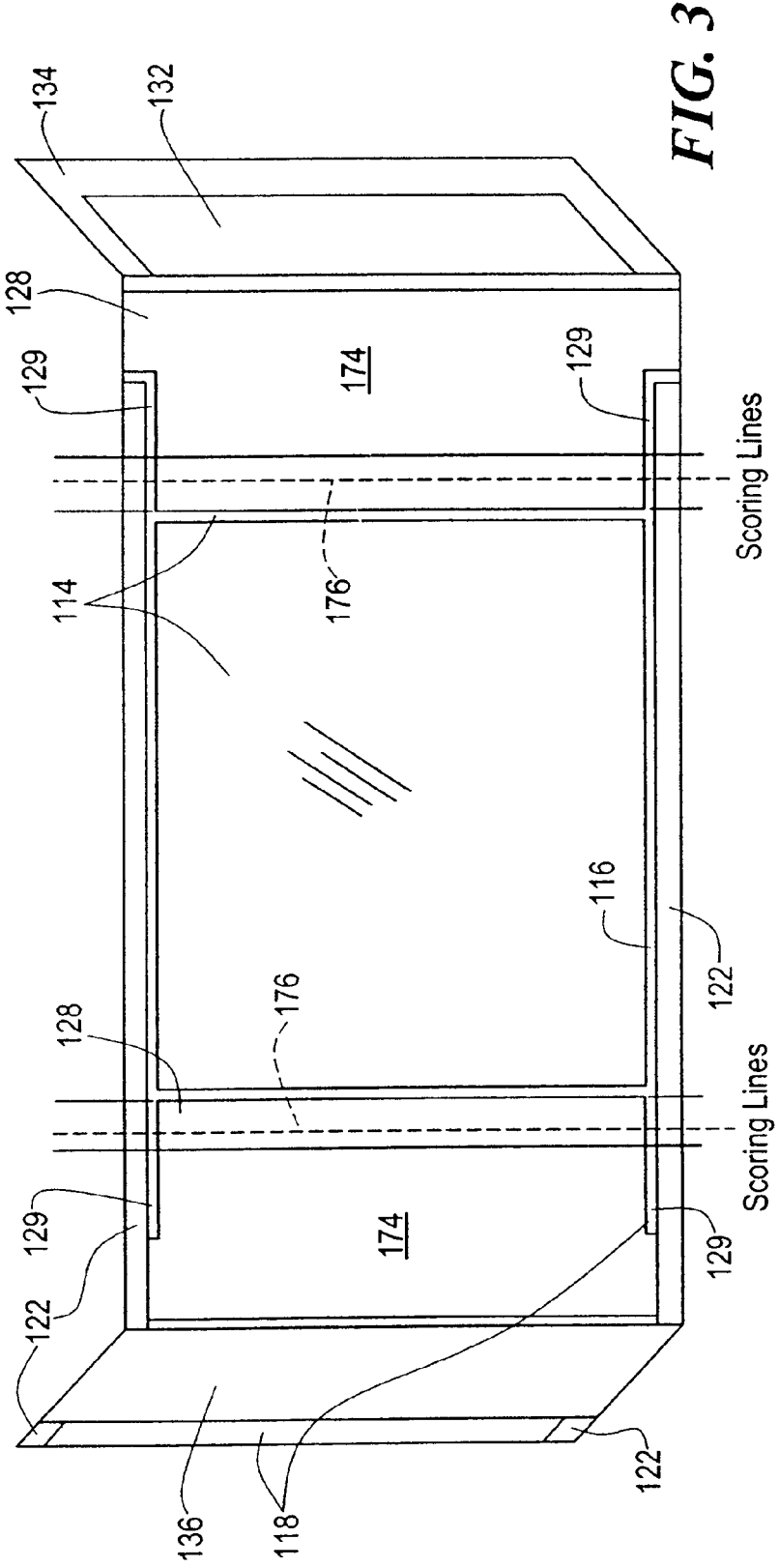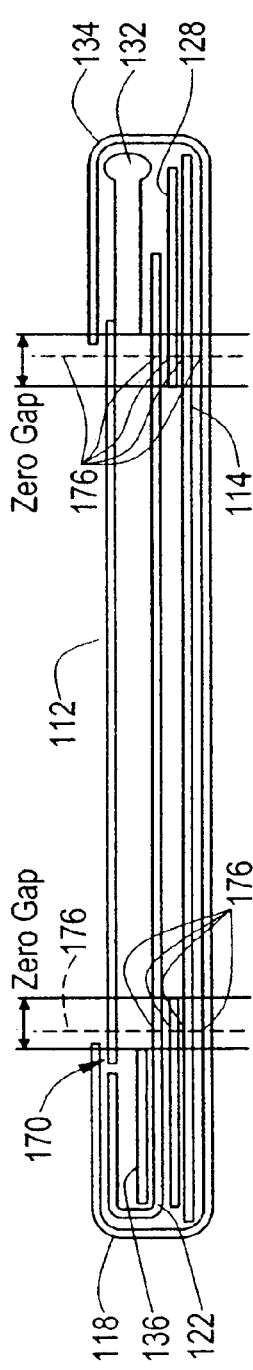

RETROFITTED SELF-DEVELOPING FILM ASSEMBLAGES AND METHODS OF MAKING THE SAME

CROSS-REFERENCE TO RELATED PATENT APPLICATIONS

The present application is a Continuation of application Ser. No. 09/920,357 filed Aug. 1, 2001, now abandoned, that claims the benefit of application Ser. No. 60/222,156 filed Aug. 1, 2000.

BACKGROUND OF THE INVENTION

The present invention relates generally to photographic film assemblages and, more particularly, to retrofitting existing self-developing film assemblages, for allowing a user to separate the spent pod and trap from the image bearing portion; as well as having the removed ends of pad, trap, and image area sealed to prevent leakage of reagent and prevent image defects.

Original photographic film assemblages of the self developing type are generally categorized as so-called "peel-apart" versions. In peel-apart versions, the user peeled-off the image bearing portion from the assemblage, while the reagent pod and trap areas remained with the discarded film assemblage following separation of the image bearing portion therefrom. Later versions of such instant films include so-called "integral" film. A variety of integral film formats are describe generally in U.S. Pat. Nos. 3,415,645; 3,695,884; 3,833,382; and, 5,888,683. For instance, such a film assemblage allows storing, spreading, collecting, and retaining of the processing fluid that initiates development of latent images. In particular and in terms of the film structure, each film unit generally includes a photosensitive sheet that captures latent images; a positive receiving sheet for producing the developed image; and, a chemical reagent system including the processing fluid. The processing fluid is stored in a rupturable container or pod for release and distribution between the photosensitive and positive sheets for initiating diffusion transfer, and a trap is used to capture the processed fluid within the confines of the film unit. The film unit functions to safely store the sensitive chemical compositions during handling and processing; insure that such chemicals effect the desired development without degradation; and prevent leakage and/or contamination of the chemicals.

One of the numerous advantages associated with these film units is that a user is not required to discard unneeded pod and trap portions following exposure since the latter were not only conveniently and compactly packaged in a single frame, but masked from view because of masking material. Such units, as can be imagined, are extremely popular and a commercial success.

Because of this, considerable capital investments have been made for manufacturing the film machinery and implementing overall processing procedures for satisfying production requirements necessary to meet the demands. Despite the foregoing, however, there are situations wherein it is desirable for allowing the integral film user the ability to easily remove the spent pod and trap portions from the image bearing portion; thereby leaving the latter with a more 35 mm-like film print appearance. It is also desirable to have the separated portions sealed from fluid leakage.

Previous efforts in the art allow a user to remove the pod and trap from the integral film, as well as seal the ends of the separated pieces. Examples of such are described in the above-noted application, as well as U.S. Pat. No. 4,693,963. These attempts require, however, relatively significant capital investments in arriving at a relatively more complicated film construction, and additional capital outlays for new machinery and the implementation of a number of new processing steps to manufacture such film.

Heretofore, there are no known approaches for easily retrofitting existing integral film constructions whereby the resulting modified film versions are simple in construction and capable of having their image portions as well as pods and traps removed and sealed. In addition, there are no known approaches for achieving the foregoing using existing film machinery that need only be slightly modified to manufacture the retrofitted film structure.

OBJECTS OF THE INVENTION

Among the objects of the present invention are the provisions for an improved film assemblage of the self-developing type that allows separation of both the pod and trap portions of the film frame, but sealing of the ends of the separated film portions including pod, trap, and image area.

It is another object of the present invention to provide such a film assemblage of the foregoing type that achieves such separating and sealing functions, but with substantially unchanged pre-existing film formats.

It is another object of the present invention to make provision for an improved film assemblage that is highly versatile in terms of allowing easy retrofitting of a variety of existing integral film systems and sizes.

It is another object of the present invention to provide for a method that allows for the manufacture of such unchanged pre-existing film formats with substantially unchanged pre-existing methods and systems.

It is another object of the present invention to provide for a film assemblage whose architecture permits the effective sealing of the flow path of a reagent or processing fluid from pod to trap, everywhere except the image areas so that after tearing, severing or otherwise removing the pod and trap segments, the edges of the image area can be sealed against fluid leakage, possible image artifacts can be eliminated; and the edges of the tom or severed pod and trap are sealed against leakage of processing fluid.

It is another object of the present invention to provide film wherein considerable changes in functionality can be realized in an extremely economical manner that does not require significant changes to the film structure in order to arrive at a construction allowing for separation of the pod and trap, and a concomitant robust sealing of the free ends thereof as well as, preferably, the image area.

The above and other objects and further scope of applicability of the present invention will become apparent from reading a detailed description thereof in conjunction with the drawings wherein like reference numerals indicate like structure throughout the several views thereof.

BRIEF DESCRIPTION OF THE DRAWINGS

FIG. 3 is a diagrammatic plan view of one preferred embodiment of a type of self-developing film assemblage modified according to the principles of the present invention.

FIG. 4 is diagrammatic side view of the embodiment illustrated in FIG. 3.

DETAILED DESCRIPTION

Figure 2:
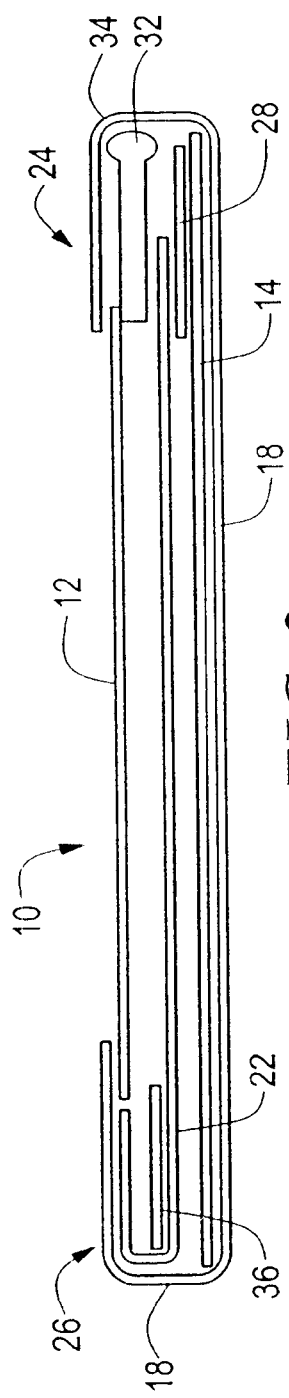
FIG. 2 is a diagrammatic side view of the film assemblage depicted in FIG. 1.
Figure 1:
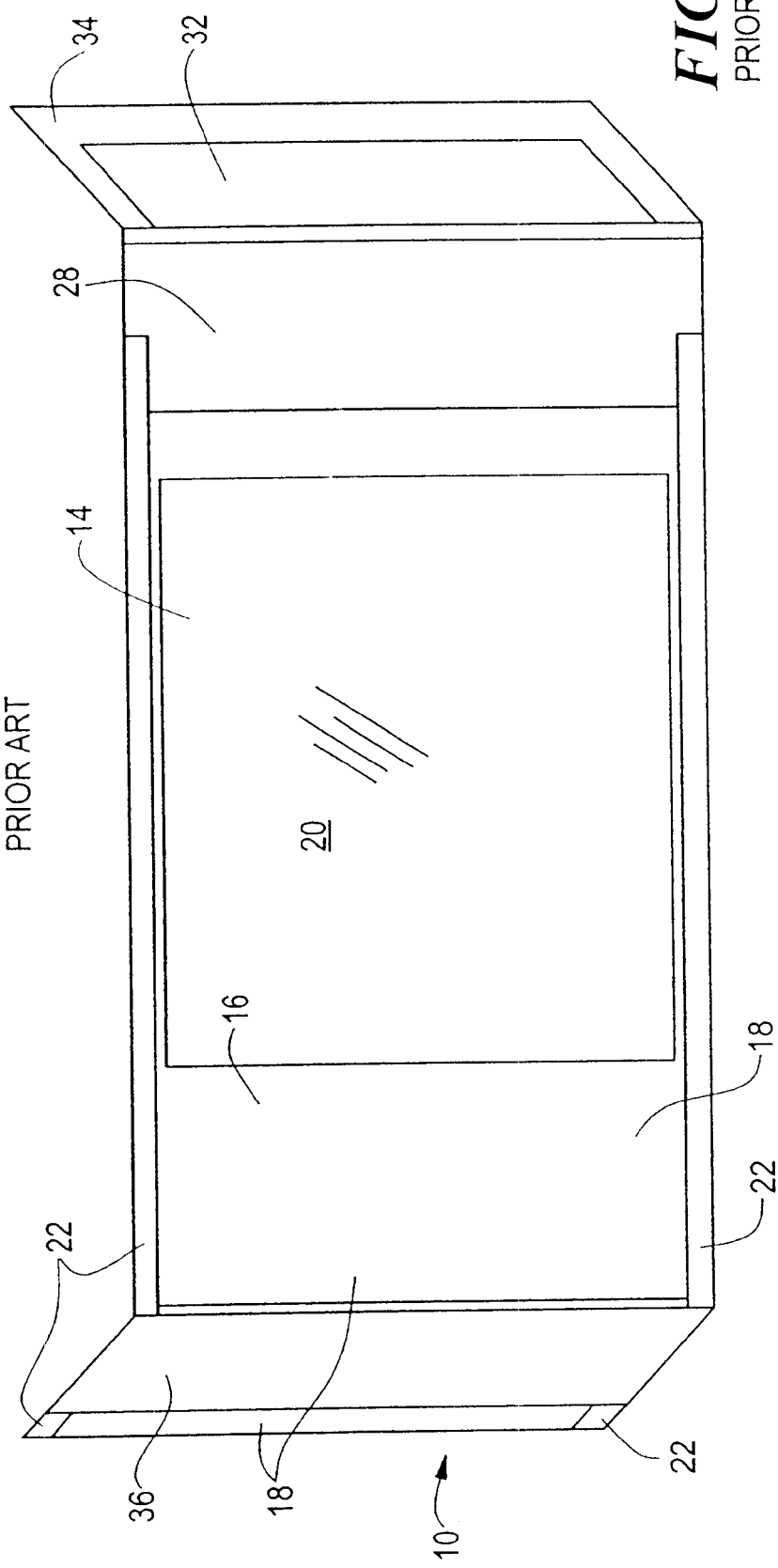
FIG. 1 is a diagrammatic view of a prior art selfdeveloping film assemblage without the modifications of the present invention.

Reference is made to FIGS. 1 and 2 for illustrating a prior art film frame assemblage 10 of self-developing integral type, such as is commercially available from Polaroid Corporation, Massachusetts, USA. As depicted, the film frame assemblage 10 includes essentially a rectangular photosensitive or negative element 12, a rectangular transparent positive image receiving sheet element 14, that is adhesively secured to an inner metallized surface 16 of a polyester rectangular masking sheet 18 having a white surface 19. A rectangular opening 20 is provided in the masking sheet 18 for allowing viewing of the processed images formed as a result of the diffusion transfer process. As will be explained the axial length of the opening is reduced for purposes of achieving the results of this invention. These components are made from a variety of materials that are well-known in the art.

A pair of identical longitudinally extending rails 22 is adhesively joined to the respective longitudinal edges of the sheet 14. They extend, as illustrated, from about a pod zone or portion 24 to the end of a fluid trap zone or portion 26. A generally rectangular piece of a jump tape element 28 is adhesively secured to the pod zone 24. A rupturable pod 32 is affixed, in a known manner, to one end of the masking sheet 18. A piece of pod tape 34 is secured at one of its ends to an end of the masking sheet 18 and is normally folded, as viewed, so that its other end portion is secured to a non-imaging surface of the negative 12. The pod tape 34 is an element sized for encompassing and enclosing the pod 32 when the pod tape is folded thereover. Pod tape is used since it is less expensive than the masking material that could otherwise be used. The edges of the pod tape 34 are secured to marginal edges of the receiving sheet, jump tape and rails to form a fluid-tight enclosed.

A conventional trap assembly 36 is secured to the metallized surface 16 of the masking sheet 18 and has its longitudinal extent extend over and secured to the rails 22. The trap portion 26 is defined by a folded end portion of the masking sheet 18 that has its end edge portion substantially heat sealed to the non-imaging side of the negative 12. For providing a fluid tight enclosure of the trap portion, the trap assembly 36 is heat sealed to the upper surfaces of the rails 22 in a known manner. It will be appreciated that the foregoing construction does not allow separation of the pod and trap.

In contrast to the foregoing film construction, reference is made to FIGS. 3 and 4 for illustrating an improved film assemblage 110 of the present invention. In this particular regard, the structures of this embodiment similar to the previous embodiment will be represented by the same reference numerals with, however, the addition of a prefix "1". The film assemblage 110, as will be explained has only been slightly modified compared to the prior art version described above. Yet notwithstanding such minor modifications, provision is made for an unproved film assemblage that allows a user to easily manually tear both the pod and trap portions 124, 126 from the imaged area. It being understood that manual separation or tearing cannot be presently achieved with the known film of the foregoing type. Additionally, such modifications allow the formation of robust fluid seals at the free ends of the pod portion, trap portion, and image area. It is pointed out that the modified film assemblage 120 is intended for use in pre-existing cameras, can be made by pre-existing film machinery using substantially the same process steps and the same materials. As a consequence, considerable changes to the film can be realized in an extremely economical manner that does not require significant changes to the film structure in order to arrive at a construction allowing for separation of the pod and trap, and a concomitant robust sealing of the free ends thereof as well as, preferably, the image area.

An essential difference of this embodiment is, however, the creation of so-called "zero gap" zones 170, 172 of substantially no clearance adjacent ends of the imaged area. That is there are substantially no air gaps between the film components in the nip of the spread rollers as they pass over the zero gap zones. The zero gapped zones 170, 172 are treated with, preferably, a fluid activated adhesive that when subjected to the processing fluid and the pressure exerted by the spread rollers (not shown) effects robust fluid seals. The zone 170 extends from the end of the trap to an image edge of the jump tape. The zone 172 extends from frame ends of pod to image edge of the pod tape. These sealed zones are formed with weakened portions that are frangible enough to permit a user to tear along them, thereby effecting a desired tearing or separating action. Towards these particular ends, the jump tape 128 is covered, preferably with a thin layer 174 of an alkali-activated adhesive; such as Gantrez™. Other types of fluid activated adhesives are contemplated for use as well as other types of adhesives (e.g., heat or pressure). The combined thickness of the jump tape 128 and the adhesive layer 174 is such as to be substantially equal to the height of the thickness of the rails 122. Moreover, the thickness of the jump tape and the coated adhesive layer is, preferably, substantially uniform. The jump tape 128 is provided with a recess 129 that accommodates the rails 122 instead of having the latter resting on the jump tape. The jump tape 128 at the reduced width portion extends substantially between the rails 122 transversely across a substantial width of the film. Furthermore, the jump tape 128 extends inwardly lengthwise by an increased amount; relative to the distance it would extend in the prior art version. The reason for the increase in length is to ensure that a pressure roller (not shown) engages the jump tape after the roller passes over and ruptures the pod. As such the jump tape will continue its function of smoothing the transitions of processing fluid flow. Further in this regard, the window or opening 120 is reduced in axial length by about the same distance the jump tape 128 is extended in length. The contact of the pressure roller maintains a uniform spreading of the processing fluid and extends the zero gap zones for reasons that will become apparent. It will be noted that the jump tape at the trap end need not have a recess to accommodate the rails, but can allow the rails to run over the lateral ends of the jump tape past the zero gap zone.

Accordingly, when the film passes through the nip of the pressure rollers (not shown), the pod is ruptured and the processing fluid flowing therefrom passes over the alkali-activated adhesive layers 174. The pressure of the processing rollers effects engagement of the activated adhesive layers 174 with the negative and the pod tape. As a consequence, the pod zone 124 is robustly sealed.

The trap zone 126 is sealed when the processing fluid flowing from between the rails and the superimposed sheet and negative activates the adhesive layer 174 on the trailing jump tape and the pressure of the processing rollers causes the layer 174 to become adhered to the trap. It will be noted that the rails can pass over the jump tape near the trap end of the film unit.

For effecting the tearing of the pods and trap, the zero gapped zones are provided in the assembled condition with weakened portions, such as frangible score lines 176 that are generally vertically aligned with each other in some or all of the negative, the coated adhesive layers, jump tape, rails, the mask, and the sheet. The score lines or perforations can be created in any pattern and depth and in any manner. Preferably, the score lines are positioned intermediate the sealed pod and trap zones of zero gap. The score lines allow easy separation of the sealed zero gap zones.

Figure 5:
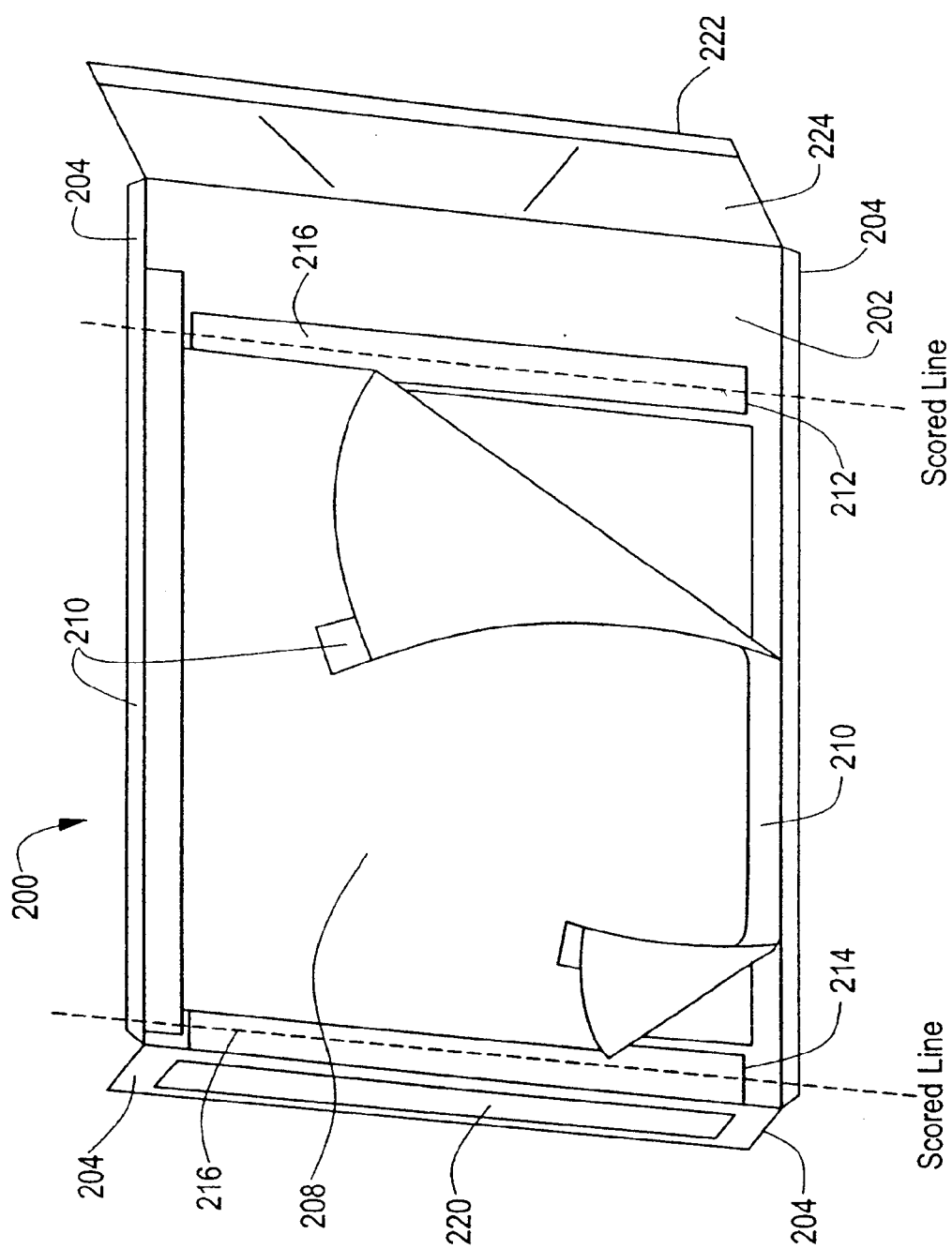
FIG. 5 is a diagrammatic plan view of another preferred embodiment of a different type of selfdeveloping film assemblage modified according to the principles of the present invention.
Figure 6:
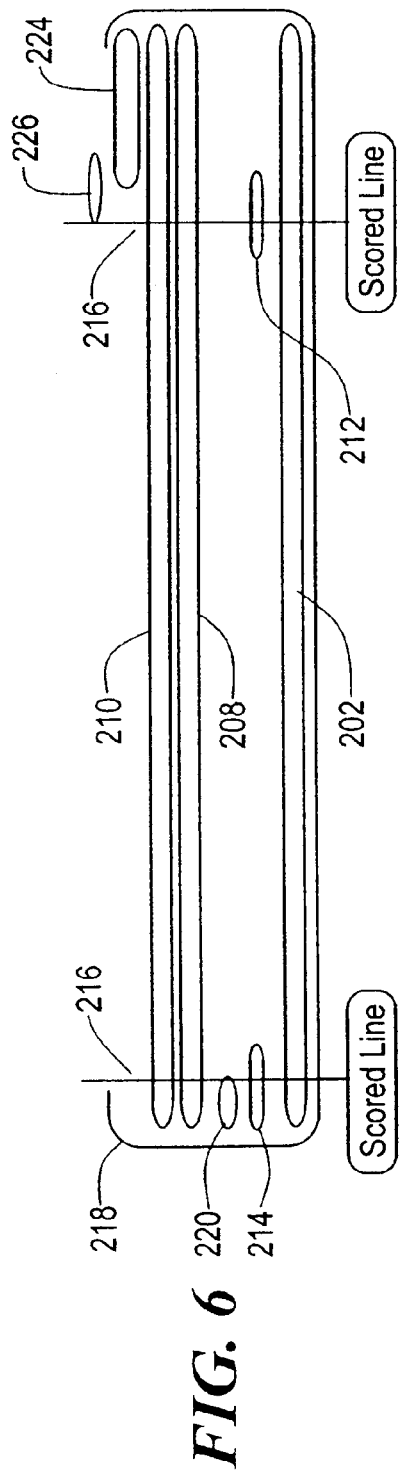
FIG. 6 is a diagrammatic side view of the preferred embodiment illustrated in FIG. 5.

FIGS. 5 and 6 illustrate another preferred embodiment of a self developing film assemblage 200 that has been retrofitted so that the pod and trap can be removed and the free ends of such pod, trap and image area sealed against processing fluid leakage. A positive image-receiving sheet 202 is adhesively coupled to an elongated masking sheet 204 having a rectangular window 206 through which the image can be viewed. A negative 208 is placed in superposed relationship to the receiving sheet 202. A pair of rails 210 are secured and positioned over the negative along the longitudinal edges of the film and have their opposing free ends secured to the receiving sheet. As viewed, a pair of pod and trap wettable adhesive sealant strips 212, 214 are attached to the sheet 202 adjacent leading and trailing ends of the image window 206. Each of the sealant strips 212, 214 can be comprised of a jump tape having an alkali-activated adhesive layer (not shown) thereon. Other adhesives can be used as well as other materials instead of jump tape can be used. A score line 216 can extend along a longitudinal axis of the strips for reasons that will be noted. Other weakened portions besides score lines can be used, such as perforations. Opposing ends of the negative 208 are secured to a portion of the sealant strips 212, 214 as depicted. When the trap zone 218 is folded, it will be noted that the mask material is secured to one end of the negative and the rails 210, while the fluid trap 220 is arranged to cover a part of the strip 214. Pod tape 222 is secured to one end of the mask 204 and when folded covers and is secured to the pod 224, rails 210 and negative 208, thereby resulting in a pod zone 226.

As in the previous embodiment, the sealant strips 212, 214 have substantially the same thickness as the rails so as to create zones of zero gap when they are subjected to the compressive forces exerted thereon by processing rollers. The zero gap area is sealed following the processing fluid activating the adhesive on the strips and the compressive forces exerted by the rollers forcing the activated surfaces into engagement with their mutually facing film components. The score lines 216 extend not only through the strips 212, 214 but the rails, sheet and mask and allow tearing of the pod and trap from the image area. Accordingly, the pod and trap zones 226 and 218; respectively, can be easily torn along the score lines 216 which, as noted, are formed intermediate the seal strips. Consequently, the free ends of both the pod and trap are sealed against fluid leakage as well as the free ends of the image area.

Figure 7:
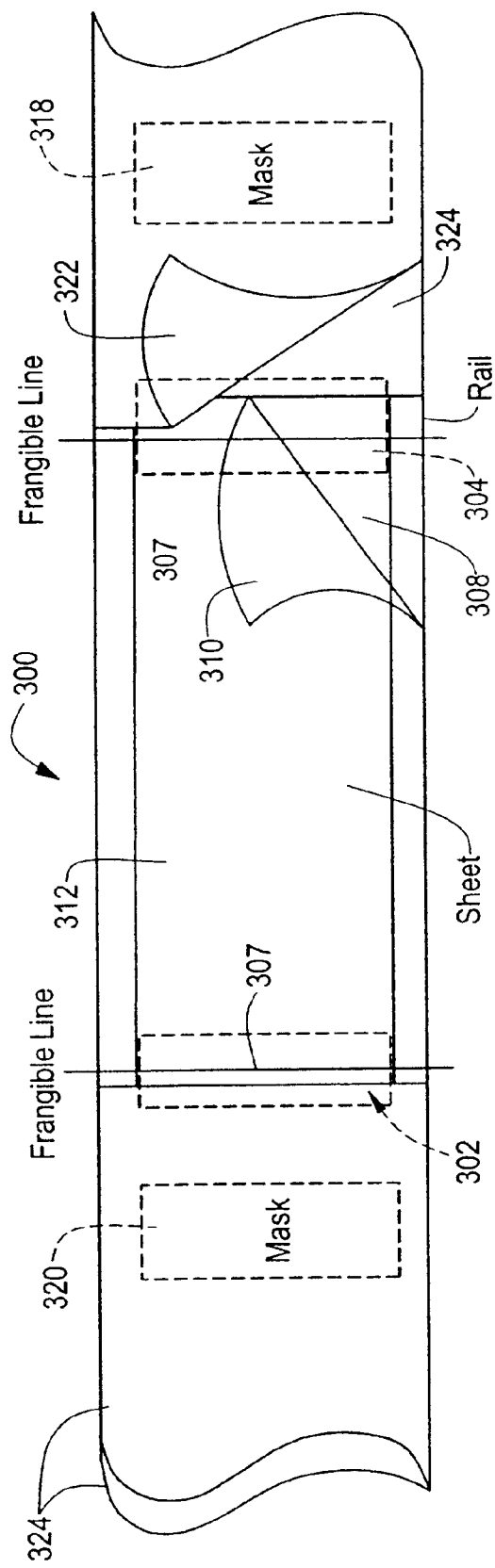
FIG. 7 is a diagrammatic plan view of yet another preferred embodiment of a different type of self-developing film assemblage modified according to the principles of the present invention.

FIG. 7 illustrates yet another embodiment of a self-developing film assemblage 300 that has been retrofitted in a manner to allow sealing and easy separation of the film. This film is similar to that described in commonly-assigned U.S. Pat. No. 5,888,683 and a description of that particular film construction is incorporated herein and made a part hereof.

In this embodiment, the film assemblage is provided with a pair of sealant strips 302 and 304. The sealant strips 302 and 304 are added to extend transversely between the parallel and spaced apart rails 306. The sealant strips 302 and 304 are made of the same materials as the jump tape earlier described with an alkali activated adhesive top surface layer (not shown). The sealant strips can be made of a variety of materials so long as they are able to function in the intended manner and in the film structure environment of the present embodiment. The sealant strips 302 304 have substantially the same thickness as the rails for purposes of facilitating the zones of zero gap noted above. The coated fluid-activated adhesive layer serves to effect the sealing action following engagement with the processing fluid and the application of pressure being exerted by the pressure or spread rollers. The strips 302 and 304 have scored lines 307 extending along their respective longitudinal axes; which in this embodiment extend transversely to the axial length of the film assemblage 300. In addition, the scoring also extends through the rails 306 as well the superimposed negative 308 and receiving sheet 310 which form an image area 312. All the scored lines are generally vertically aligned with respect to each other for enhancing the ability of a user being able to tear or separate pod and trap portions 314, 316; respectively, from the image area 312. The pod and trap portions 314, 316 include pod 318 and trap 320 that are sandwiched between corresponding pairs of masking or connecting strips 322 and 324; respectively. The connecting strips define fluid paths for the processing fluid from the pod to the image area and from the image area to the trap. The connecting strips have their respective ends attached to the negative and receiving sheets short of the score lines; as is illustrated. It will be appreciated that the processing fluid will activate the fluid-activated adhesive layer on the sealant strips and these areas and their mutually facing surfaces (negative and receiving sheets) in the film will be compressed together to provide a robust seal after application of pressure being exerted thereon by the pressure rollers (not shown) during film processing. As in the previous embodiments, the surface area of the sealant-strips carrying the adhesive is sized in order to effect zones of zero gap not only substantially along the width of the film between the rails, but in the axial direction for a sufficient dimension that allows the pressure exerted by the rollers to compress the film so as to insure robust sealing on both sides of the score lines 307. Thus, the zones of zero gap extend between the connecting sheets or masks so as to be compressed, whereby they provide a seal when compressed by the pressure from the spread or pressure rollers. Accordingly, when the user tears the film assemblage along the score lines 307 not only are the free ends of the image area sealed, but the free ends of the pod and trap portions as well. Of course, perforations or other areas of weakened zones can be used instead of scoring.

Various modifications and adaptations of the present invention will become readily apparent to those of ordinary skill in the art. While the principles of the present invention have been applied to retrofitting the film systems noted above, the present invention is not so limited and such principles can be applied to other known types of integral film units.

What is claimed is:

1. An improved self developing film unit adapted to be exposed and then processed to form a visible image in an area thereof by moving said film unit relative to and between pressure applying rollers to distribute a processing fluid with said film unit toward a trailing end thereof said film unit comprising:

a) an image recording means of the self-developing type including a first and second overlying layer one of which is exposable to form a latent photographic image, wherein said image recording means comprises a photosensitive layer;

b) an image receiving layer in overlying and coextensive relationship to said photosensitive layer, wherein said image receiving layer being of the integral diffusion transfer type;

c) a processing fluid supply means including a rupturable reservoir of processing fluid at a leading end portion of said film unit so as to discharge said processing fluid for distribution between said first and second overlying layers;

d) a spacer means connected to and between said first and second overlying layers providing a processing space therebetween for allowing processing fluid to pass therethrough, wherein said spacer means comprises a pair of spaced apart and generally parallel elongated rails coextensive with and adjacent opposed marginal edges of said layers;

e) a fluid trap means at said trailing end portion of said film unit for collecting excess processing fluid traveling through said processing space;

f) a mask adhered to an outer surface of said first overlying layer, wherein said mask having an aperture therein defining an image area, wherein said mask extending over and around the leading edge of said film unit adjacent said fluid trap means and over and around the trailing end of said film unit adjacent said fluid trap means; and g) a substantially zero gap zone created as said leading end by juxtaposedly disposing one or more material strips between said first and second overlying layers, said strips being comprised of at least an adhesive layer, wherein said material strips comprise thicknesses substantially the same as the thickness of said spacer rails, said strips running substantially parallel with said fluid supply means and also interposed between said fluid supply means and said image area, whereby said zero gap zone provides a substantially full width contact of the film surface with said pressure applying spread rollers applied across said film surface, whereby further ensuring uniform flow of the processing fluid during the spreading process.

2. The film unit of claim 1, wherein said zero gap zones are created at both said leading and trailing ends of said film unit.

3. The film unit of claim 1, wherein said material strips comprises a tape and an adhesive layer adhered thereto.

4. The film unit of claim 3, wherein said jump tape is notched.

5. An improved self-developing film unit adapted to be exposed and then processed to form a visible image in an area thereof by moving said film unit relative to and between pressure applying rollers to distribute a processing fluid with said film unit toward a trailing end thereof, said film unit comprising:

a) an image recording means of the self-developing type including a first and second overlying layer one of which is exposable to form a latent photographic image, wherein said image recording means comprises a photosensitive layer, b) an image receiving layer in overlying and coextensive relationship to said photosensitive layer, wherein said image receiving layer and said photosensitive layer being of the integral diffusion type;

c) a processing fluid supply means including a rupturable reservoir of processing fluid at a leading end portion of said film unit so as to discharge said processing fluid for distribution between said first and second overlying layers;

d) a spacer means connected to and between said first and second overlying layers for providing a processing space therebetween for allowing processing fluid to pass therethrough, wherein said spacer means comprises a pair of spaced apart and generally parallel elongated rails coextensive with and adjacent opposed marginal edges of said layers;

e) a fluid trap means at said trailing end portion of said film unit for collecting excess processing fluid traveling through said processing space;

f) a first fluid-tight coupling means including a fluid passage for fluidically coupling said reservoir to a leading end of said processing space for allowing processing fluid from a ruptured reservoir to be introduced into said processing space and initiated processing of the latent image, wherein said first coupling means having one end portion sealably secured to an exterior surface of said reservoir and a second end portion sealably secured to an interior surface of a leading end portion of said image recording means;

g) a second fluid-tight coupling means including a fluid passage for fluidically coupling a trailing end of said processing space with said trap means for allowing processing fluid to enter into said trap means, wherein said second coupling means having an end portion sealably secured to and within the trailing end portion of said image recording means and an opposite end portion sealably secured to an exterior surface of said trap means, wherein each of said first and second fluid-tight coupling means is made of a pair of resiliently flexible sheets which are sealably joined together to define the respective fluid passages and which are made of a foldable and rollable material to thereby facilitate folding and unfolding thereof as well as permit rolling action of the fold during folding of the film unit, wherein the combined thickness of each of said sheets is generally equal to a thickness of one of said rails; and h) a substantially zero gap zone created at said leading end by juxtaposedly disposing one or more material strips between said first and second overlying layers, wherein said strips being comprised of at least an adhesive layer, wherein said material strips comprise thicknesses substantially the same as the thickness of said spacer rails, said strips running substantially parallel with said fluid supply means and also interposed between said fluid supply means and said image area, whereby said zero gap zone provides a substantially full width contact of the film surface with said pressure lying rollers applied across said film surface, whereby further ensuring uniform flow of the processing fluid during the spreading process.

6. A method of manufacturing an improved self-developing film unit adapted to be exposed and then processed to form a visible image in an area thereof by moving said film unit relative to and between pressure applying rollers to distribute a processing fluid with said film unit toward a trailing end thereof, said method comprising the steps of a) providing an image recording means of the self-developing type including a first and second overlying layer one of which is exposable to form a latent photographic image, wherein said image recording means comprises a photosensitive layer, wherein said image receiving layer in overlying and coextensive relationship to said photosensitive layer, and wherein said image receiving layer and said photosensitive layer being of the integral diffusion transfer type;

b) providing a processing fluid supply means including a rupturable reservoir of processing fluid at a leading end portion of said film unit so as to discharge said processing fluid for distribution between said first and second overlying layers;

c) providing spacer means connected to and between said first and second overlying layers for providing a processing space therebetween for allowing processing fluid to pass therethrough, said spacer means comprises a pair of spaced apart and generally parallel elongated rails coextensive with and adjacent opposed marginal edges of said layers;

d) providing a fluid trap means at said trailing end portion of said film unit for collecting excess processing fluid traveling through said processing space;

e) providing a mask adhered to an outer surface of said first overlying layer, said mask having an aperture therein defining an image area, said mask extending over and around the leading edge of said film unit adjacent said fluid trap means and, over and around the trailing end of said film unit adjacent said fluid trap means; and f) creating a substantially zero gap zone created at said leading end by juxtaposedly disposing one or more material stripes between said first and second overlying layers, wherein said strips being comprised of at least an adhesive layer, wherein said material strips comprise thicknesses substantially the same as the thickness of said spacer rails, said strips running substantially parallel with said fluid supply means and also interposed between said fluid supply means and said image area, whereby said zero gap zone provides a substantially full width contact of the film surface with said pressure applying rollers applied across said film surface, whereby further ensuring uniform flow of the processing fluid during the spreading process.

* * * * *